Sept. 13, 1938.  R. T. G. MASON  2,129,742
LIFESAVING CRAFT
Filed May 29, 1937  6 Sheets-Sheet 1

INVENTOR
RONALD.T.G.MASON
PER Raymento
ATTORNEYS

Sept. 13, 1938.　　　R. T. G. MASON　　　2,129,742
LIFESAVING CRAFT
Filed May 29, 1937　　　6 Sheets-Sheet 2
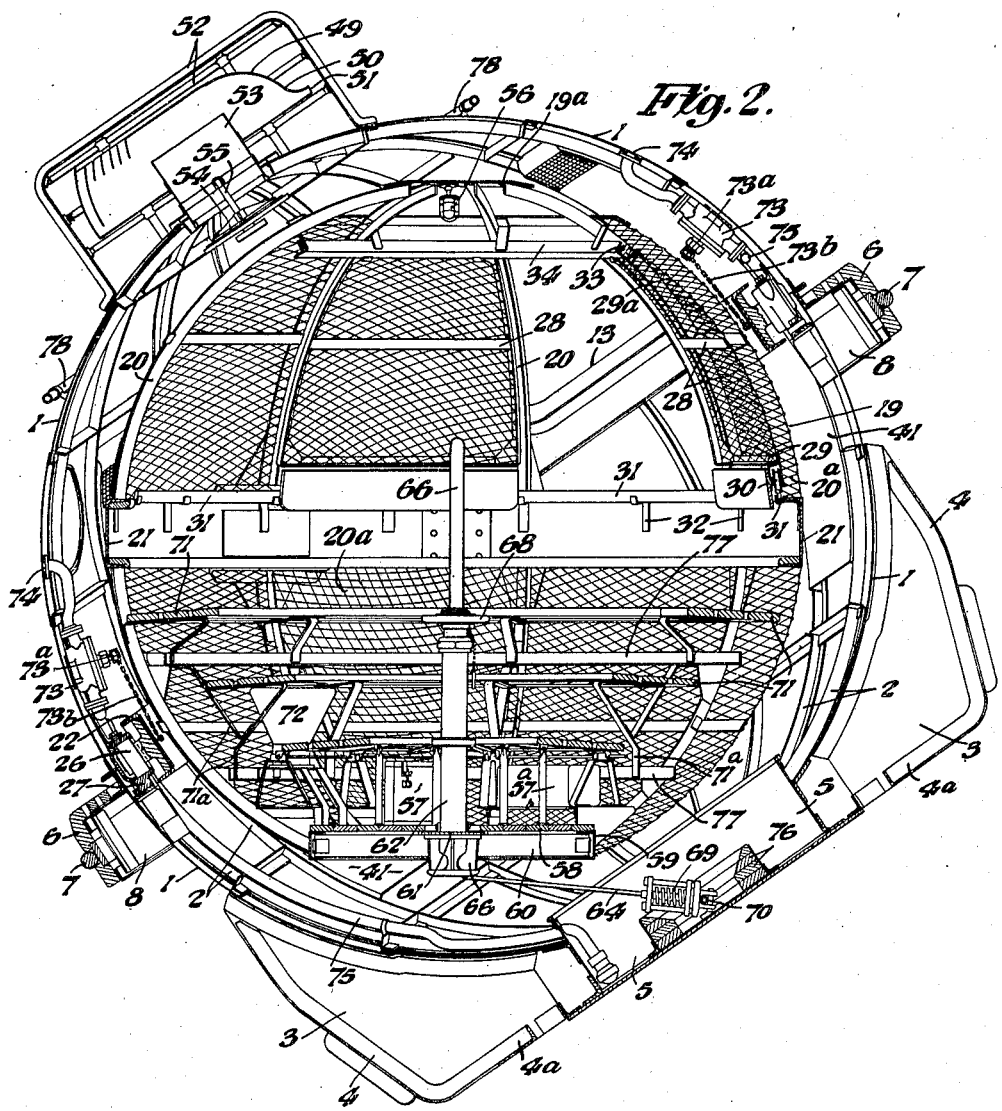
INVENTOR
RONALD. T. G. MASON
PER Rayner Ho
ATTORNEYS Sept. 13, 1938.                R. T. G. MASON                 2,129,742
                                LIFESAVING CRAFT
                              Filed May 29, 1937            6 Sheets—Sheet 3
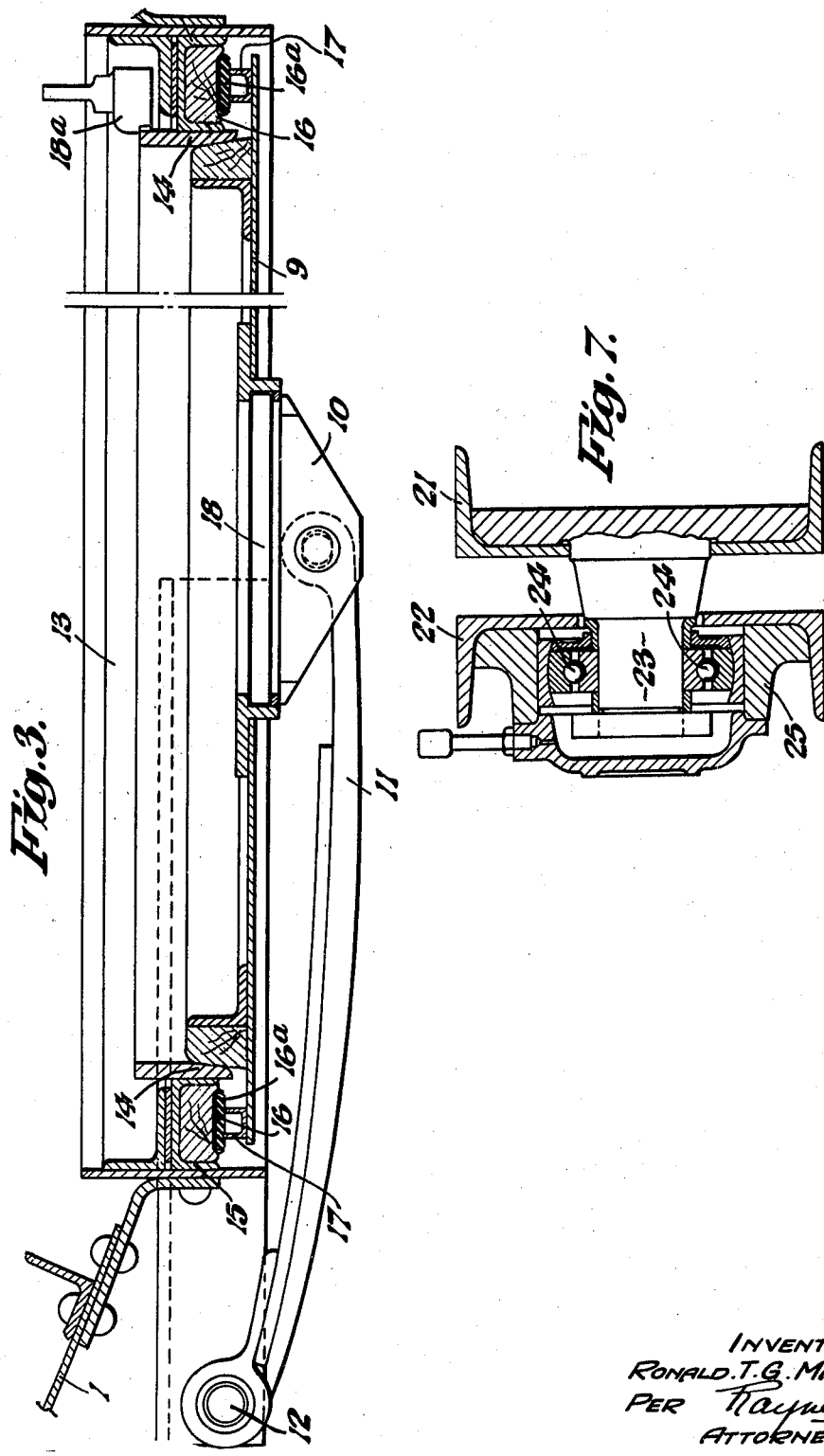
INVENTOR
RONALD.T.G. MASON
PER Raynor&
ATTORNEYS

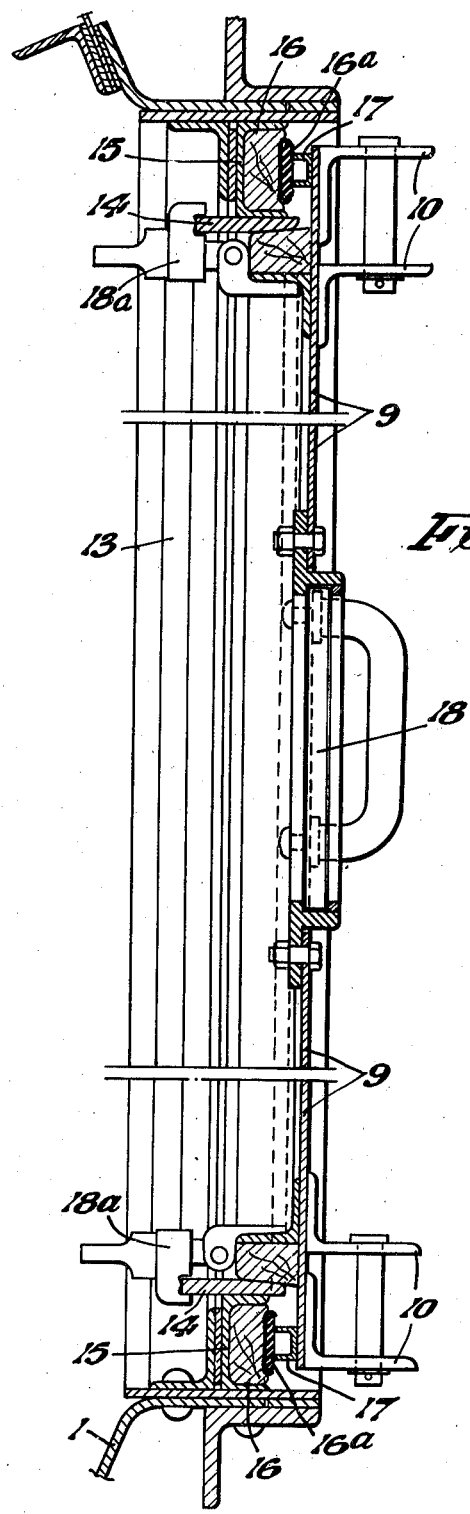

Sept. 13, 1938.  R. T. G. MASON  2,129,742
LIFESAVING CRAFT
Filed May 29, 1937  6 Sheets—Sheet 5
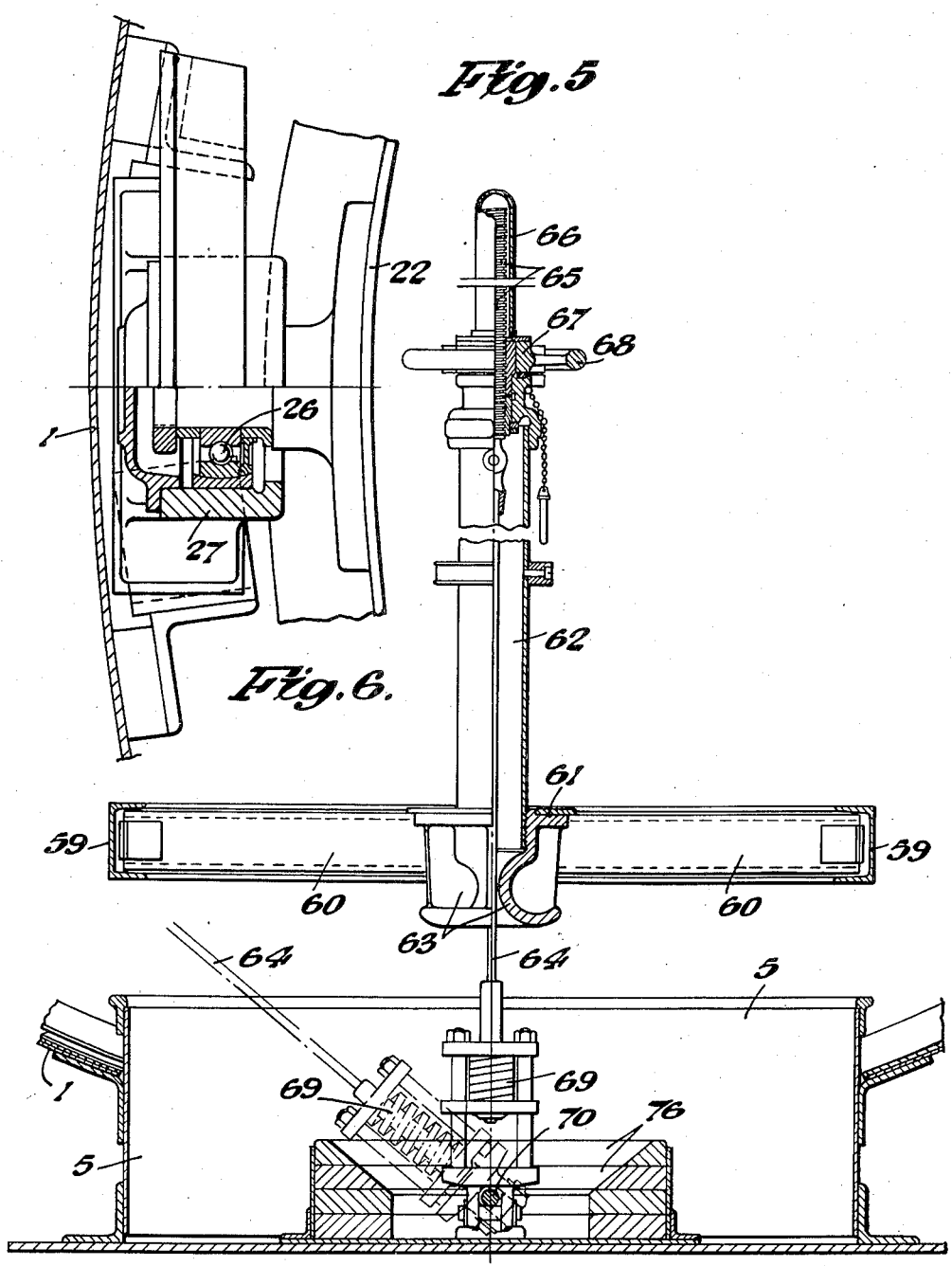
INVENTOR
RONALD. T. G. MASON
PER  Rayner &
ATTORNEYS

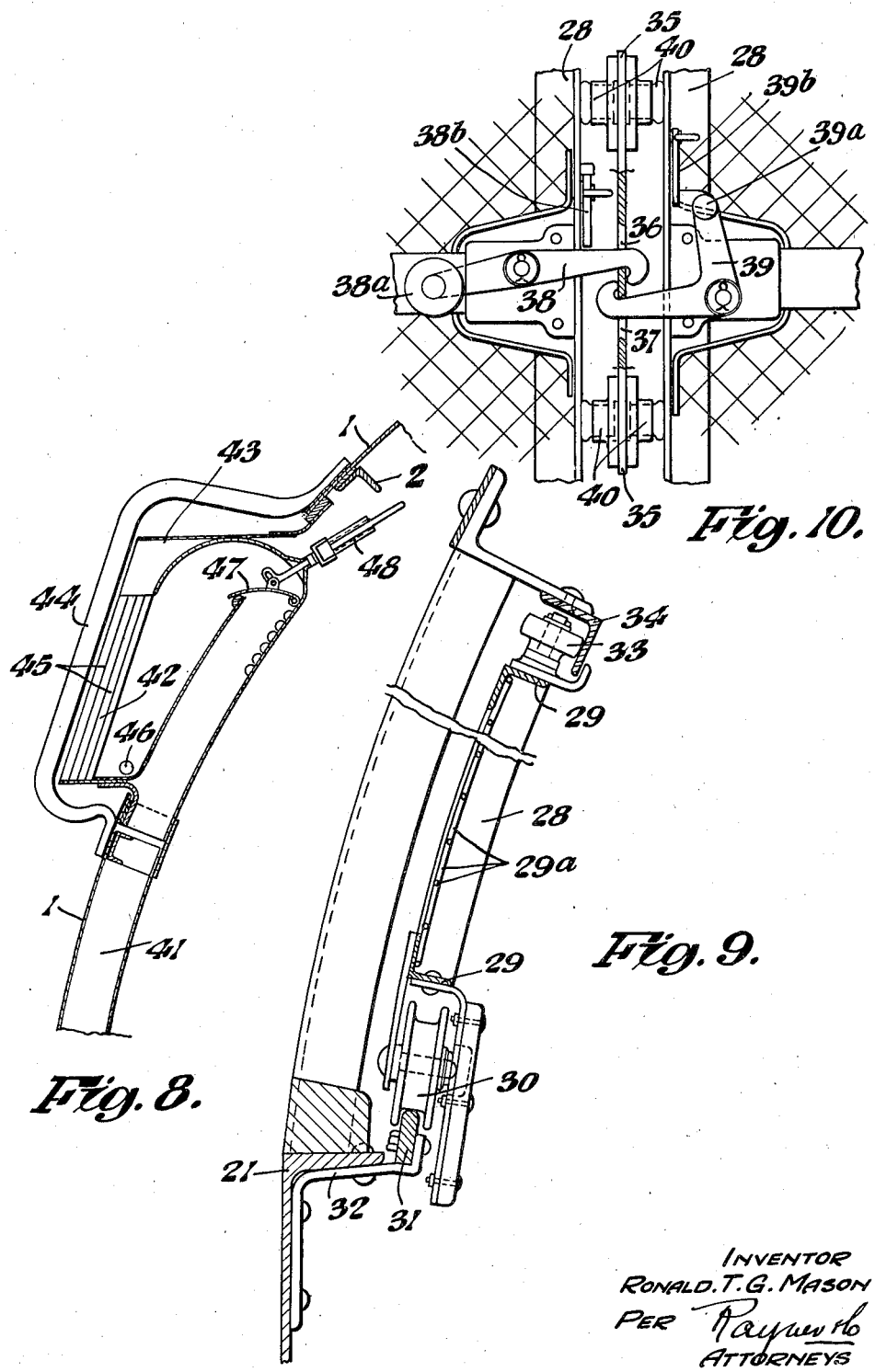

Patented Sept. 13, 1938

2,129,742

UNITED STATES PATENT OFFICE 2,129,742

LIFESAVING CRAFT

Ronald Thomas George Mason, Westcliff-on-Sea, England, assignor to British Marine Utilities Company Limited, Prittlewell, Southend-on-Sea, England Application May 29, 1937, Serial No. 145,624
In Great Britain June 3, 1936

9 Claims. (Cl. 9—4)

My present invention relates to life saving craft for use on sea vessels, and more particularly to the type of apparatus in which an outer buoyant shell accommodates a passenger compartment in such manner that the one can rock or oscillate relatively to the other, as for example by the use of an outer spherical shell within which is substantially concentrically supported in spaced relationship a passenger compartment, which compartment is supported within the shell by means which enables it by reason of its own inertia to maintain substantially a position equivalent to that of an even keel when the outer shell rocks in the water. The chief object of this invention is to improve upon the means for supporting the passenger compartment within the shell to obtain the desired relative movement. Another object of this invention is to enable an occupant of the craft to adjust and/or prevent the degree of freedom of relative movement of the passenger compartment and shell.

According to this invention life saving craft for use on sea-going vessels comprises an outer buoyant shell and an inner passenger compartment substantially wholly enclosed within the outer shell and connected to the outer shell by a gimbal ring coupling permitting relative oscillation of the inner compartment and outer shell.

In carrying one embodiment of the invention into practice an outer buoyant spherical shell, which may be composed of a number of metal plates of part spherical configuration bolted, riveted or welded together, is formed with a circumferential fender between its top and base, the top having a ventilating cowl and the base a ballast chamber. Supported concentrically within this shell is a substantially spherical passenger compartment, the space between the outer shell and this compartment accommodating a gimbal ring disposed circumferentially about the said compartment and connected thereto and to the shell on intersecting axes of oscillation to obtain a gimbal or universal joint action. The passenger compartment is preferably a wire mesh or wire netting cage secured to a plurality of arcuate T section frame members arranged to form a foundation for a spherical compartment to ensure adequate ventilation for the occupants of the compartment, and within the lower part of the cage are arranged a plurality of substantially annular platforms or seats for the passengers. It is preferred to limit the extent of freedom of relative oscillation of the passenger compartment and outer shell, and for this purpose means are provided operable from the interior of the passenger compartment to prevent or adjust this relative oscillation. Advantage can be taken of the relative oscillation to operate pumps for drawing off and discharging bilge water from the outer shell.

The outer shell is provided with keel plates, webs or frame members to facilitate maintaining direction and also to minimize spinning of the outer shell. Suitable doors, preferably arranged in one or more pairs adapted to be swung towards and away from each other are hinged to the shell so as to form part of the wall of the outer shell when they are closed. Likewise the inner or passenger compartment is provided with doors, and it is preferred to arrange these as sliding doors to obviate swinging them across the interior of the passenger compartment.

In order that this invention may be clearly understood and readily carried into effect I have appended hereto six sheets of drawings illustrating an embodiment thereof, and wherein:—

Fig. 2 is a sectional elevation showing the inner or passenger compartment in an even keel position but with the outer shell at an inclination appropriate to the condition which could obtain in a rough or choppy sea.

Fig. 3 is a part sectional detail plan view of one of the doors of the outer shell.

Fig. 4 is a sectional end elevation of such door.

Fig. 5 is a detail elevation view partly in section showing a device for adjusting the extent of freedom of relative oscillation of the passenger compartment and outer shell.

Fig. 6 is a detail sectional plan view of one of the outer journals of the gimbal ring where it is connected to the outer shell.

Fig. 7 is a detail sectional elevation of one of the inner journals of the gimbal ring where it supports the passenger compartment.

Fig. 8 is a detail sectional elevation of an air ventilator opening built into the outer shell.

Fig. 9 is a broken detail sectional end elevation of one of the sliding doors of the passenger compartment, and Fig. 10 is a detail part sectional elevation of the means for securing the doors of the passenger compartment.

Figure 1:
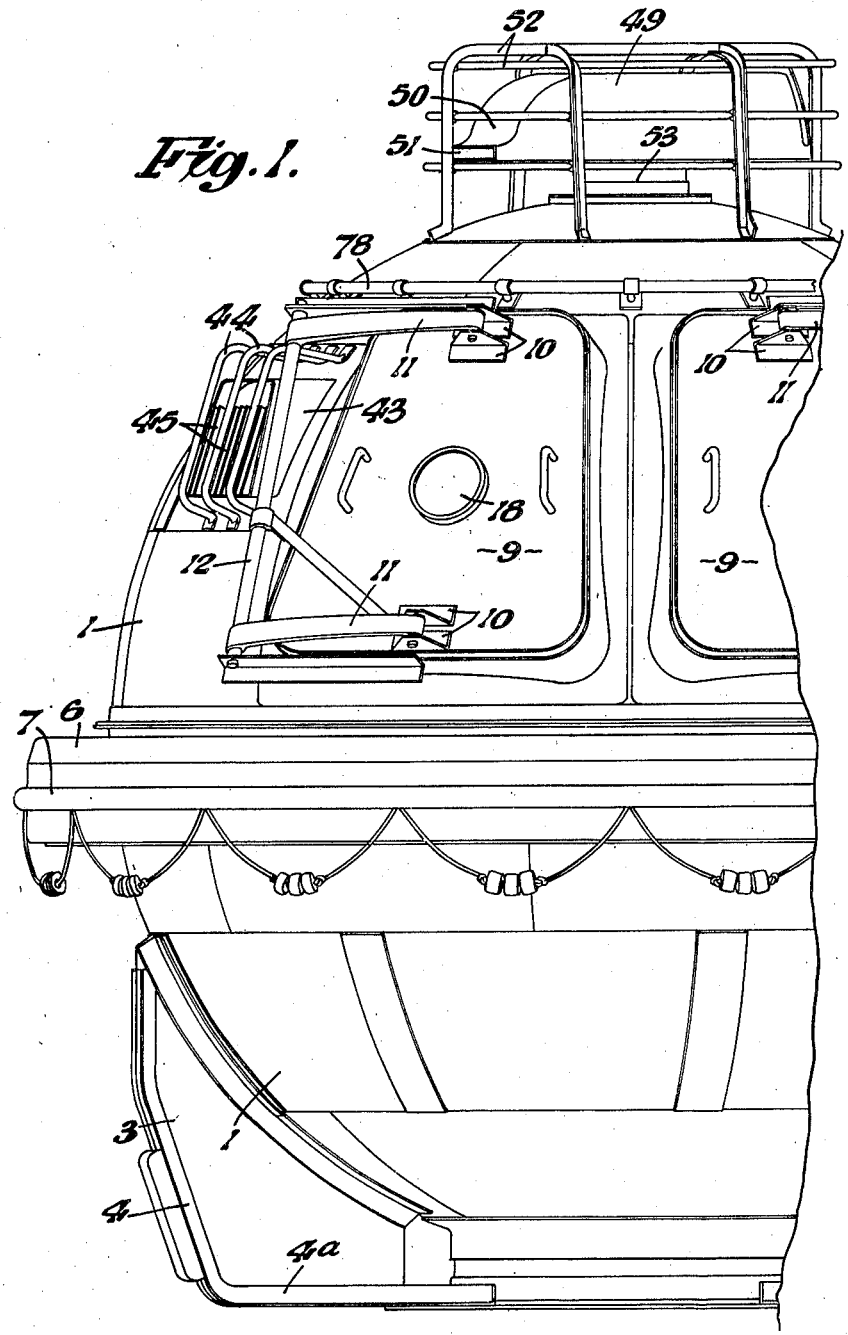
Fig. 1 is a broken outside elevation of the life saving craft.

Referring to the drawings, the craft shown is adapted for use on surface craft, but with slight modifications can be adapted for use on submarines. It comprises an outer spherical shell 1 of metal plates suitably secured together upon a skeleton spherical frame 2, or the said plates can be formed with abutting flanges by which they are secured together, their flanges acting as stiffening webs. This outer shell is adapted to float in the water and for the purpose of partly stabilizing it and to facilitate keeping a course the base of the shell is fitted with a pair of diametrically opposed vanes 3 embodied in suitable keel frames 4 having horizontal parts 4a which lie in substantially the same plane as the base of a shallow cylindrical ballast chamber 5 fitted into the base of the shell 1. Progressing upwardly, the shell 1 has midway between its base and top a circumferentially disposed annular member 6 of inverted L section which is grooved to support a rope fender 7, and is strengthened internally by radiating webs 8. This annular member 6 forms a convenient ledge upon which persons can stand for obtaining easy access to a pair of doors 9, 9 by which ingress to and egress from the interior of the craft may be effected through openings 13.

These doors 9 (which may be duplicated on diametrically opposite sides of the shell) are not hinged directly to the shell but are formed with hinge brackets 10 midway between the ends of their upper and lower edges by which each of them is pivoted to the free ends of a pair of arms 11 fixed to the upper and lower ends of a pivot pin 12 supported in a pair of angle bar brackets fixed to the shell 1 in such manner that their horizontal limbs serve as locating plates or guides for the door as it is about to close. By supporting the doors in this manner all of their edges can be pressed in a water-tight manner against appropriate seatings around the door openings 13. The doors can have slightly tapered peripheries so that they may wedge into correspondingly shaped seatings 14 which may form the inner surfaces of channel section frame members 15 fitted with packing 16 and 16a against which are adapted to abut the edges of channel section sealing members 17. The doors may also be fitted with suitable portholes 18 in order to avoid an excessive number of frames and joints in the shell itself. The doors are maintained closed by suitable fastening screws and catches 18a operable from inside the craft. Mounted inside the shell is the compartment 19 adapted to receive the passengers and this is of spherical configuration and is concentrically spaced from the shell 1. The compartment 19 is preferably composed of a skeleton frame 20 upon which is mounted wire mesh 20a to provide an open or cagelike wall whereby it is adequately ventilated. Disposed circumferentially in the cylindrical frame is a main frame member 21 and this forms the inner ring of a gimbal ring assembly, such inner ring being journalled to an outer ring 22 as shown in Fig. 7, this preferably being effected by trunnion members 23 engaged in ball or roller bearings 24 mounted in bosses 25 fixed to the outer ring 22. This outer ring 22 is in turn journalled in a somewhat similar manner in bearings 26 fixed in bosses 27 carried by the shell 1 as shown in Fig. 6.

It will be apparent from the foregoing that the passenger compartment is free to oscillate in all directions relatively to the outer shell and that therefore it can maintain a substantially even keel position when the outer shell is rocking by reason of the action of the waves.

Access to the interior of the compartment 19, following the opening of the beforementioned doors 9, is effected by the separation of a pair of slidable doors 28 forming part of the wall of the compartment. These doors 28 have outer frames 29 across which is stretched the appropriate proportion of wire netting 29a, the lower edges of these frames 29 being fitted with grooved pulleys 30 adapted to run upon rails 31 fixed to suitable brackets 32 attached to the centre frame member 21. The upper ends of the doors 29 carry rollers 33 which rotate on substantially vertical axes and bear against angle section guide rails 34 secured across the upper edges of the openings which are normally closed by the said doors.

It is preferable to ensure that the doors 28 are securely locked in position but can be readily opened and for this purpose the opposed vertical edges of the doors carry latches adapted to engage in a latch plate 35 interposed between the doors. This latch plate has a pair of apertures 36 and 37 in which engage respectively the hook-like opposed ends of a pair of levers 38 and 39. The lever 38 is weighted at one end as at 38a so as to tend to raise the hook end thereof clear of the lower edge of the aperture 36 to allow the door to be opened. This lever is of the straight bar type, whereas the latch 39 is in the form of a bell crank lever and is weighted at its upper end 39a so as to tend to lower the hook end away from the upper edge of the aperture 37. The two levers are prevented from assuming the said free positions by sliding bolts 38b and 39b, which can be raised to enable the latches 38 and 39 to assume the releasing position. Suitable buffers 40 are carried by the doors adapted to abut against opposite sides of the latch plate 35. Ventilation of the interior of the craft can be effected by means of ventilator shafts or ducts 41 extending along the inner surface of the shell 1 and communicating by their upper ends with openings 42 (see Fig. 8) inside of the shell 1, these openings preferably being located in cowls 43 protected by guard rails 44. The openings 42 are fitted with a plurality of closely related serrated or corrugated plates 45 so that the air has to pass through sinuous passages in entering the ducts 41. By this means, ingress of sea water is considerably minimized and any that does obtain access to the cowl 43 can escape by way of outlet apertures 46. Suitable dampers 47 are provided at the tops of the ducts 41 for regulating the admission of air and also if necessary for closing the ducts. These dampers can be operated by nut and bolt mechanism 48 or other suitable controlling devices inside the compartment 19.

In addition to the foregoing means of ventilation an overhead cowl 49 can be fitted to the shell 1, this cowl having a trailing end 50 slotted as at 51 (see Fig. 2) for the extraction of bad air. This extracting cowl can be protected by a suitable cage 52 and it is rotatable by means of a central column 53 having suitable bearings and open top and bottom, and adapted to be adjusted in effective area at its inner end by means of an axially adjustable damper or closure plates 54 which can be actuated by a centrally threaded member 55. Access to this controlling damper can be effected through the top of the compartment 19 which is left open for a short portion of its area as at 19a. Located over the centre of this opening is an electric lamp 56 this providing a convenient location of illumination for the interior of the craft. The source of current for the requirements of the lamp 56 and other electrical plant or apparatus inside the craft can be supplied from batteries 57 alongside a water storage tank 57a accommodated in the base of the compartment 19 such base having a boarded or other convenient form of floor 58 mounted upon a frame ring 59 of angle or channel section. Extending upwardly through the centre of this ring 59 and suitably secured thereto by radial arms 60 and a centre part 61 is a hollow column 62 threaded at its lower end in a thimble 63 (see Fig. 3) through which passes a cable 64 connected at its upper end to a feed screw 65. This feed screw can be fed axially within a sleeve 66 by rotation of a nut 67 forming part of a handwheel 68, mounted upon the top of the sleeve 62, it being understood that the nut 67 is held against movement of translation. By this means of adjustment the extent of maximum freedom of oscillation of the inner compartment 19 relatively to the shell 1 can be adjusted, the cable 64 being anchored at its lower end to the base of the shell 1, e. g., through the medium of a spring or other form of shock absorber 69 universally connected as at 70 to the base of the ballast chamber 5.

Disposed around the interior of the compartment 19 are a series of platforms or seats 71 for the use of the occupants of the craft and any suitable sanitary apparatus 72 can be provided as part of the equipment of the craft.

For the purpose of removing bilge water from the ballast chamber a pair or other suitable number of semi-rotary pumps 73 can be mounted inside the shell at convenient heights and provided with outlets 74 and uptake pipes 75 depending into the ballast chamber. Each pump can have a lever 73a disposed diametrically relative to its axis of rotation two ends of each lever being connected by ligatures 73b to the gimbal ring 22 at points opposite sides of its axis members 23. By this means the pumps 73 will be operated automatically by the oscillation of the gimbal ring 22 relatively to the shell 1. Adjustable ballast rings 76 can be provided in the base of the ballast chamber.

The platforms 71 can be supported on suitable angle brackets 71a secured at their ends to annular angle section bars 77, fixed to appropriate parts of the skeleton frame of the compartment 19.

Disposed about the shell 1 are suitable hand rails 78 conveniently located for engagement by persons standing on the circumferential ring 6.

By means of this invention apparatus which is practically immune from submergence in rough weather and is strong and compact is provided, which can be launched in rough weather with little if any risk of capsizing, and also all the essential adjuncts for convenience and safety are available.

When the craft is required for use on submarines it can be adapted to be completely sealed against ingress of water, and can have a door arrangement in its base through which entry to the craft can be effected by the crew of a submarine, the door being sealed when the crew are within the craft and the craft released so as to rise to the surface. In such an arrangement, the ballast 76 may be disposed about the door and the means for adjusting the maximum oscillation of the passenger compartment relatively to the shell can be arranged in the top of the craft.

I claim:—

1. Life saving craft comprising an outer buoyant substantially spherical shell, a substantially spherical passenger compartment wholly enclosed within and concentrically spaced from said shell, a ring in the shell and disposed about the compartment, diametrically opposed coaxial pivots pivoting said compartment to said ring, means pivoting said ring to the shell so that it is free to oscillate on an axis at right angles to and intersecting the axis of pivotal connection of the compartment to said ring, doors in the shell and said compartment, a flexible ligature connecting said compartment to said shell to limit oscillation of the compartment relatively to the shell, and means operable from within the said compartment for varying the effective length of said ligature, whereby the maximum permissive angle of relative oscillation of the shell and compartment can be varied and also the doors in the shell and compartment brought into alignment.

2. Life saving craft comprising an outer substantially spherical buoyant shell, a substantially spherical passenger compartment supported substantially concentrically within said shell in spaced relationship, a ring encircling the passenger compartment in the space between the said shell and pivotally connected at diametrically opposite points to the shell, and diametrically opposed pivots connecting said compartment to said ring and on an axis transverse to the axis of the pivots of said ring, doors in the shell and compartment, and means operable from within the shell to restrain oscillation of the compartment relatively to said shell.

3. Life saving craft according to claim 2 wherein a bilge chamber is provided in the base of the shell, a conduit extending from the bilge chamber to an outlet in the upper part of the shell, a pump for raising and discharging the bilge water, and means connecting the pump to said ring for operating the pump automatically by the relative oscillations of the shell.

4. Life saving craft according to claim 2 wherein a vertical tubular guide is provided in the base of the passenger compartment up which passes one end of said ligature, a feed screw with means for raising and lowering it relatively to said guide receiving such end of the ligature, shock absorbing means yieldingly opposing tension on the ligature, and connecting the other end of the ligature to the base of the shell.

5. Life saving craft comprising an outer buoyant substantially spherical shell, a substantially spherical passenger compartment wholly enclosed within and concentrically spaced from said shell, a ring in the shell and disposed about the compartment, diametrically opposed coaxial pivots pivoting said compartment to said ring, means pivoting said ring to the shell so that it is free to oscillate on an axis at right angles to and intersecting the axis of pivotal connection of the compartment to said ring, doors in the shell and said compartment, a flexible ligature connecting said compartment to said shell to limit oscillation of the compartment relatively to the shell, and means operable from within the said compartment for varying the effective length of said ligature whereby the maximum permissive angle of relative oscillation of the shell and compartment can be varied and also the doors in the shell and compartment brought into alignment, said ligature being connected to the shell and compartment at opposed points on their common normally vertical axis, and means with said ligature to absorb shock when it is tensioned.

6. Life saving craft comprising an outer substantially spherical buoyant shell, a substantially spherical passenger compartment supported substantially concentrically within said shell in spaced relationship, a ring encircling the passenger compartment in the space between the said shell and pivotally connected at diametrically opposite points to the shell, and diametrically opposed pivots connecting said compartment to said ring and on an axis transverse to the axis of the pivots of said ring, doors in the shell and compartment, means operable from within the shell to restrain oscillation of the compartment relatively to said shell, and shock absorbing means adapted to absorb the shock on the compartment when the permissible maximum angle of oscillation thereof relatively to the shell occurs.

7. Life saving craft comprising an outer buoyant substantially spherical shell, a passenger compartment wholly accommodated within said shell and consisting of a skeleton frame of spherical outline concentric in relation to said shell, wire netting stretched over said frame to form an enclosure, a ring encircling the passenger compartment in the space between the said shell and pivotally connected at diametrically opposite points to the shell, and diametrically opposed pivots connecting said compartment to said ring and on an axis transverse to the axis of the pivots of said ring, doors in the shell and compartment, and means operable from within the shell to restrain oscillation of the compartment relatively to said shell.

8. Life saving craft comprising an outer substantially spherical shell, a hinged door for ingress and egress, a substantially spherical passenger compartment concentrically accommodated within the shell, a circumferentially slidable door arranged on the compartment and adapted to align with the said hinged door, means operable from within the said compartment to effect an airtight sealing closure of said hinged door and to secure the sliding door in the closed position, a ring in the shell and disposed about the compartment, diametrically opposed co-axial pivots pivoting said compartment to said ring, means pivoting said ring to the shell so that it is free to oscillate on an axis at right angles to and intersecting the axis of pivotal connection of the compartment to said ring, and means operable from within said compartment for adjusting the permissible maximum angle of oscillation of said compartment relatively to said shell and also to restrain relative oscillation to maintain said doors in alignment.

9. Life saving craft comprising an outer buoyant substantially spherical shell, a passenger compartment wholly accommodated within said shell and consisting of a skeleton frame of spherical outline concentric in relation to said shell, wire netting stretched over said frame to form an enclosure, a ring encircling the passenger compartment in the space between the said shell and pivotally connected at diametrically opposite points to the shell, diametrically opposed pivots connecting said compartment to said ring and on an axis transverse to the axis of the pivots of said ring, doors in the shell and compartment, means operable from within the shell to restrain oscillation of the compartment relatively to said shell, an opening in the upper part of the shell, a ventilating shaft extending from said opening to the lower part of the shell, a cowl over said opening, a plurality of sinuous narrowly spaced baffles in said cowl impeding free ingress of water to the craft, and means for draining water from the cowl.

RONALD THOMAS GEORGE MASON.